US010635711B2

(12) United States Patent
Achuthan et al.

(10) Patent No.: US 10,635,711 B2
(45) Date of Patent: Apr. 28, 2020

(54) METHODS AND SYSTEMS FOR DETERMINING A PRODUCT CATEGORY

(71) Applicant: PayPal, Inc., San Jose, CA (US)

(72) Inventors: Ashita Achuthan, Cupertino, CA (US); Olivier G. Dumon, San Francisco, CA (US); Ryan McDonald, San Francisco, CA (US); Muhammad Faisal Rehman, San Jose, CA (US); Julie Lavee Netzloff, San Jose, CA (US); Ken Sun, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 528 days.

(21) Appl. No.: 14/930,950

(22) Filed: Nov. 3, 2015

(65) Prior Publication Data

US 2016/0055564 A1 Feb. 25, 2016

Related U.S. Application Data

(63) Continuation of application No. 13/250,936, filed on Sep. 30, 2011, now Pat. No. 9,183,280.

(51) Int. Cl.
*G06F 16/538* (2019.01)
*G06F 16/951* (2019.01)
(Continued)

(52) U.S. Cl.
CPC ........ *G06F 16/538* (2019.01); *G06F 3/04842* (2013.01); *G06F 16/3338* (2019.01); *G06F 16/951* (2019.01); *G06Q 30/0625* (2013.01)

(58) Field of Classification Search
CPC ......... G06F 17/30348; G06F 17/30607; G06F 17/30356; G06F 17/30371; G06F 17/30584; G06F 16/3338; G06F 16/951; G06F 3/0842; G06F 16/538; G06F 3/04842; G06Q 30/0625
See application file for complete search history.

(56) References Cited

U.S. PATENT DOCUMENTS 6,489,968 B1 12/2002 Ortega et al.
6,853,982 B2 2/2005 Smith et al.
(Continued)

FOREIGN PATENT DOCUMENTS

WO WO-2011106555 A1 9/2011

OTHER PUBLICATIONS

"U.S. Appl. No. 12/476,028, Advisory Action daed Jan. 18, 2013", 3 pgs.

(Continued)

*Primary Examiner* — Miranda Le
(74) *Attorney, Agent, or Firm* — Maschoff Brennan (57) ABSTRACT

Methods and systems for using a demand metric for disambiguating a keyword entered from a user of a client machine, the keyword ambiguously identifying a product category, deriving a dominant product category that indicates the probable identity of the product category, and providing selectable images of aspects of the dominant product category for rendering at the client machine. Selection of one of the selectable images of aspects of the dominant product category disambiguates the identity of the ambiguously identified product category. Additional aspects of the disambiguated product category are then presented to the user.

11 Claims, 10 Drawing Sheets

(51) Int. Cl.
*G06F 16/33* (2019.01)
*G06F 3/0484* (2013.01)
*G06Q 30/06* (2012.01)

(56) References Cited

U.S. PATENT DOCUMENTS

| | | | |
|---|---|---|---|
| 7,246,110 | B1 | 7/2007 | Musgrove et al. |
| 7,302,429 | B1 | 11/2007 | Wanker |
| 7,428,504 | B2* | 9/2008 | Song .................. G06Q 30/0256 705/14.41 |
| 7,444,327 | B2 | 10/2008 | Watson et al. |
| 7,565,367 | B2 | 7/2009 | Barrett et al. |
| 7,603,360 | B2 | 10/2009 | Ramer et al. |
| 7,765,227 | B1* | 7/2010 | Khoshnevisan .. G06F 17/30867 707/769 |
| 7,873,547 | B2* | 1/2011 | Borom ................... G06Q 30/02 705/26.8 |
| 7,908,173 | B1* | 3/2011 | Hill ........................ G06Q 30/02 705/26.64 |
| 7,933,798 | B1* | 4/2011 | Yan ........................ G06Q 30/02 705/14.42 |
| 7,953,739 | B2* | 5/2011 | York ...................... G06Q 30/02 707/748 |
| 8,065,199 | B2* | 11/2011 | Dumon ............. G06F 17/30979 705/26.7 |
| 8,145,636 | B1* | 3/2012 | Jeh ....................... G06F 16/353 707/736 |
| 8,180,690 | B2* | 5/2012 | Mayle ................ G06Q 30/0641 705/27.1 |
| 8,290,811 | B1 | 10/2012 | Robinson et al. |
| 8,301,764 | B2 | 10/2012 | Konig et al. |
| 8,306,845 | B2 | 11/2012 | D'imporzano et al. |
| 8,359,301 | B2 | 1/2013 | Aziz et al. |
| 8,364,525 | B2* | 1/2013 | Kothiwal ........... G06Q 30/0256 705/14.1 |
| 8,364,528 | B2 | 1/2013 | Selinger et al. |
| 8,370,336 | B2 | 2/2013 | Dumon et al. |
| 8,433,297 | B2 | 4/2013 | Ramer et al. |
| 8,438,155 | B1* | 5/2013 | Fedorynski ....... G06F 17/30864 707/723 |
| 8,489,515 | B2 | 7/2013 | Mathur |
| 8,548,876 | B1* | 10/2013 | Fox ....................... G06Q 30/00 705/14.1 |
| 8,566,180 | B2 | 10/2013 | Koski |
| 8,612,306 | B1* | 12/2013 | Mukherjee ............ G06Q 30/02 705/26.5 |
| 8,719,249 | B2* | 5/2014 | Bennett ................ G06F 16/353 707/708 |
| 8,738,612 | B1* | 5/2014 | Tourn ................... G06F 16/248 707/723 |
| 8,849,865 | B1* | 9/2014 | Mosoi ............... G06F 17/30864 707/713 |
| 8,996,495 | B2* | 3/2015 | Rehman .............. G06F 17/3053 707/706 |
| 9,084,016 | B2* | 7/2015 | Knudson ................ G06F 3/0482 |
| 9,183,280 | B2 | 11/2015 | Achuthan et al. |
| 9,275,409 | B2* | 3/2016 | Mebed ............... G06Q 30/0627 |
| 2001/0044758 | A1 | 11/2001 | Talib et al. |
| 2002/0174022 | A1* | 11/2002 | Tenorio ............. G06Q 30/0204 705/26.62 |
| 2003/0128236 | A1 | 7/2003 | Chen |
| 2003/0135490 | A1 | 7/2003 | Barrett et al. |
| 2005/0222987 | A1 | 10/2005 | Vadon |
| 2005/0246332 | A1* | 11/2005 | Wang ................... G06F 16/951 |
| 2006/0200445 | A1 | 9/2006 | Chen et al. |
| 2006/0253790 | A1 | 11/2006 | Ramarajan et al. |
| 2006/0287986 | A1* | 12/2006 | Westphal .......... G06F 17/30011 |
| 2006/0288023 | A1 | 12/2006 | Szabo |
| 2007/0027856 | A1 | 2/2007 | Lee |
| 2007/0288433 | A1 | 12/2007 | Gupta et al. |
| 2008/0033939 | A1 | 2/2008 | Khandelwal |
| 2008/0097975 | A1 | 4/2008 | Guay et al. |
| 2008/0250026 | A1 | 10/2008 | Linden et al. |
| 2008/0270398 | A1 | 10/2008 | Landau et al. |
| 2009/0006374 | A1 | 1/2009 | Kim et al. |
| 2009/0018996 | A1 | 1/2009 | Hunt et al. |
| 2009/0125511 | A1 | 5/2009 | Kumar |
| 2009/0138458 | A1 | 5/2009 | Wanker et al. |
| 2009/0164453 | A1 | 6/2009 | Rothman |
| 2009/0248626 | A1 | 10/2009 | Miller |
| 2009/0271270 | A1 | 10/2009 | Regmi et al. |
| 2009/0281923 | A1 | 11/2009 | Selinger et al. |
| 2010/0114654 | A1 | 5/2010 | Lukose et al. |
| 2010/0262514 | A1 | 10/2010 | Westphal |
| 2010/0262596 | A1 | 10/2010 | Dumon et al. |
| 2010/0262601 | A1 | 10/2010 | Dumon et al. |
| 2010/0287129 | A1 | 11/2010 | Tsioutsiouliklis et al. |
| 2010/0293494 | A1 | 11/2010 | Schmidt |
| 2010/0325553 | A1 | 12/2010 | Levy |
| 2011/0054960 | A1 | 3/2011 | Bhatia et al. |
| 2011/0066650 | A1* | 3/2011 | Fuxman .............. G06F 16/3349 707/776 |
| 2011/0078049 | A1* | 3/2011 | Rehman ................ G06Q 10/10 705/27.1 |
| 2011/0113063 | A1* | 5/2011 | Schulman ......... G06F 17/30997 707/771 |
| 2011/0128288 | A1 | 6/2011 | Petrou et al. |
| 2011/0173102 | A1 | 7/2011 | Burns et al. |
| 2011/0213679 | A1* | 9/2011 | Petkov .................. G06Q 30/02 705/27.1 |
| 2011/0295895 | A1 | 12/2011 | Musgrove et al. |
| 2011/0307411 | A1* | 12/2011 | Bolivar ............. G06F 17/30867 705/347 |
| 2012/0066073 | A1 | 3/2012 | Dilip et al. |
| 2012/0078731 | A1 | 3/2012 | Linevsky et al. |
| 2012/0101918 | A1 | 4/2012 | Battle et al. |
| 2012/0246026 | A1* | 9/2012 | Xu ........................ G06Q 30/06 705/26.63 |
| 2012/0259882 | A1 | 10/2012 | Thakur et al. |
| 2013/0035985 | A1 | 2/2013 | Gilbert |
| 2013/0086103 | A1 | 4/2013 | Achuthan et al. |

OTHER PUBLICATIONS

"U.S. Appl. No. 12/476,028, Appeal Brief filed May 13, 2013", 16 pgs.
"U.S. Appl. No. 12/476,028, Appeal Decision mailed Dec. 31, 2015", 8 pgs.
"U.S. Appl. No. 12/476,028, Examiner's Answer dated Jul. 31, 2013", 6 pgs.
"U.S. Appl. No. 12/476,028, Final Office Action dated Feb. 2, 2012", 13 pgs.
"U.S. Appl. No. 12/476,028, Final Office Action dated Nov. 6, 2012", 14 pgs.
"U.S. Appl. No. 12/476,028, Non Final Office Action dated Jun. 28, 2012", 15 pgs.
"U.S. Appl. No. 12/476,028, Non Final Office Action dated Sep. 30, 2011", 10 pgs.
"U.S. Appl. No. 12/476,028, Response filed Jan. 7, 2013 to Final Office Action dated Nov. 6, 2012", 14 pgs.
"U.S. Appl. No. 12/476,028, Response filed Jan. 30, 2012 to Non Final Office Action dated Sep. 30, 2011", 11 pgs.
"U.S. Appl. No. 12/476,028, Response filed Jun. 4, 2012 to Final Office Action dated Feb. 8, 2012", 12 pgs.
"U.S. Appl. No. 12/476,028, Response filed Oct. 29, 2012 to Non Final Office Action dated Jun. 28, 2012", 11 pgs.
"U.S. Appl. No. 12/476,134, Final Office Action dated Jan. 24, 2012", 10 pgs.
"U.S. Appl. No. 12/476,134, Non Final Office Action dated Jul. 18, 2011", 8 pgs.
"U.S. Appl. No. 12/476,134, Notice of Allowance dated Oct. 5, 2012", 5 pgs.
"U.S. Appl. No. 12/476,134, Response filed Jun. 25, 2012 to Final Office Action dated Jan. 24, 2012", 10 pgs.
"U.S. Appl. No. 12/476,134, Response filed Nov. 7, 2011 to Non-Final Office Action dated Jul. 18, 2011", 9 pgs.
"U.S. Appl. No. 13/032,328, Response filed Nov. 6, 2015 to Non Final Office Action dated May 6, 2015", 17 pgs.

(56) References Cited

OTHER PUBLICATIONS

"U.S. Appl. No. 13/032,338, Final Office Action dated Jul. 5, 2013", 18 pgs.
"U.S. Appl. No. 13/032,338, Non Final Office Action dated Apr. 7, 2014", 19 pgs.
"U.S. Appl. No. 13/032,338, Non Final Office Action dated Aug. 31, 2012", 18 pgs.
"U.S. Appl. No. 13/032,338, Non Final Office Action dated Nov. 28, 2014", 16 pgs.
"U.S. Appl. No. 13/032,338, Response filed Aug. 7, 2014 to Non Final Office Action dated Apr. 7, 2014", 15 pgs.
"U.S. Appl. No. 13/032,338, Response filed Oct. 7, 2013 to Final Office Action dated Jul. 5, 2013", 8 pgs.
"U.S. Appl. No. 13/032,338, Response filed Dec. 28, 2012 to Non Final Office Action dated Aug. 31, 2012", 13 pgs.
"U.S. Appl. No. 13/032,338, Supplemental Amendment filed Aug. 25, 2014", 8 pgs.
"U.S. Appl. No. 13/250,936, Advisory Action dated Jan. 7, 2015", 3 pgs.
"U.S. Appl. No. 13/250,936, Advisory Action dated May 17, 2013", 3 pgs.
"U.S. Appl. No. 13/250,936, Examiner Interview Summary dated Dec. 23, 2014", 3 pgs.
"U.S. Appl. No. 13/250,936, Final Office Action dated Mar. 7, 2013", 8 pgs.
"U.S. Appl. No. 13/250,935, Final Office Action dated Oct. 24, 2014", 11 pgs.
"U.S. Appl. No. 13/250,936, Non Final Office Action dated Apr. 2, 2014", 10 pgs.
"U.S. Appl. No. 13/250,936, Non Final Office Action dated Oct. 26, 2012", 7 pgs.
"U.S. Appl. No. 13/250,936, Notice of Allowance dated Jun. 26, 2015", 15 pgs.
"U.S. Appl. No. 13/250,936, PTO Response to Rule 312 Communication dated Oct. 8, 2015", 3 pgs.
"U.S. Appl. No. 13/266,936, Response filed Jan. 28, 2013 to Non Final Office Action dated Oct. 26, 2012", 12 pgs.
"U.S. Appl. No. 13/250,936, Response filed May 7, 2013 to Final Office Action dated Mar. 7, 2013", 13 pgs.
"U.S. Appl. No. 13/250,936, Response filed Jul. 8, 2013 to Final Office Action dated Mar. 7, 2013", 14 pgs.
"U.S. Appl. No. 13/250,936, Response filed Aug. 4, 2014 to Non Final Office Action dated Apr. 2, 2014", 16 pgs.
"U.S. Appl. No. 13/250,936, Response filed Sep. 20, 2012 to Restriction Requirement dated Aug. 29, 2012", 10 pgs.
"U.S. Appl. No. 13/250,936, Response filed Dec. 23, 2014 to Final Office Action dated Oct. 24, 2014", 17 pgs.
"U.S. Appl. No. 13/250,936, Restriction Requirement dated Aug. 29, 2012", 5 pgs.
"U.S. Appl. No. 13/250,936, Supplemental Notice of Allowability dated Jul. 13, 2015", 12 pgs.
"U.S. Appl. No. 13/250.936, Supplemental Amendment filed Sep. 3, 2014", 15 pgs.
"International Application Serial No. PCT/US11/26114, Search Report dated Apr. 25, 2011", 4 pgs.
"International Application Serial No. PCT/US11/26114, Written Opinion dated Apr. 25, 2011", 12 pgs.

* cited by examiner

CATEGORIES ▶ FASHION  MOTORS  TICKETS  DEALS  CLASSIFIEDS

OMEGA WATCHES | ALL CATEGORIES ◆ | SEARCH | ADVANCED

RELATED SEARCHES: LONGINES WATCH, OMEGA SEAMASTER, TAG HEUER WATCH, ROLEX WATCH, MEN'S OMEGA WATCH, OMEGA CONSTELLATION

▶ CATEGORIES — 530
OMEGA WATCHES
510
JEWELRY AND WATCHES (5,685)
WATCHES (5,630) — 540
VINTAGE & ANTIQUE JEWELRY (21)
JEWELRY DESIGN & REPAIR (8)
MEN'S JEWELRY (6)
FINE JEWELRY (4)
MORE ▶
SEE ALL CATEGORIES

▶ CONDITION
☐ NEW (1,848)
☐ USED (3,982)
☐ NOT SPECIFIED (456)
CHOOSE MORE...

▶ PRICE
$ [     ] TO $ [     ]  ⏫

▶ SELLER
☐ EBAY TOP RATED SELLERS
SPECIFY SELLERS...

▶ BUYING FORMATS
☐ AUCTION
☐ BUY IT NOW
CHOOSE MORE...

▶ SHOW ONLY

WATCH FINDER^BETA  TELL US WHAT YOU THINK
START HERE TO FIND THE PERFECT WATCH. YOU CAN SELECT ALL THAT APPLY.

520

| GENDER 522 | TYPE 523 | BAND 524 | 521 SEARCH BRANDS |
|---|---|---|---|
| WOMEN'S | CASUAL | LUXURY | GOLD | PLASTIC | ■ OMEGA |
| MEN'S | DRESS | SPORT | LEATHER | GOLD/STEEL | ☐ ACCUTRON™ |
| CHILDREN'S | FASHION | VINTAGE | STEEL | TITANIUM | ☐ BREITLING™ |
| UNISEX |  |  | RUBBER | CERAMIC | ☐ BULOVA™ |
|  |  |  |  |  | ☐ CITIZEN™ |

🔍 ENLARGE

NICE MENS OMEGA          OMEGA 18K LADIES      MEN'S OMEGA              OMEGA SPEEDMASTER
SEAMASTER               GOLD DRESS WATCH      DYNAMIC AUTOMATIC        SCHUMACHER LEGEND
PROFESSIONAL FULL                             SWISS MADE WATCH         CHRONOGRAPH WATCH
SIZE 46MM               <1M       $300.00    NR
BUY IT NOW $1,100.00                          23M          $699.00     28M        $3,595.00

METHODS AND SYSTEMS FOR DETERMINING A PRODUCT CATEGORY

RELATED APPLICATION

This application is a continuation of U.S. patent application Ser. No. 13/250,936, filed on Sep. 30, 2011, entitled "Methods and Systems Using Demand Metrics for Presenting Aspects for Item Listings Presented in a Search Results Page," the benefit of priority of which is claimed hereby, and which is incorporated by reference herein in its entirety.

TECHNICAL FIELD

The present disclosure generally relates to data processing techniques. More specifically, the present disclosure relates to methods and systems for managing how search results are processed and presented to a user of a computer-based trading or ecommerce application.

BACKGROUND

In the retail industry, it has long been known that product placement can greatly impact sales. For instance, in a grocery store, a product (e.g., a box of cereal) placed on a shelf at approximately eye level will tend to outsell a similar product placed on a bottom shelf. This general principle holds true in the context of ecommerce as well. When presenting item listings in a search results page, a position of an item listing within a page—particularly, a position relative to other item listings—can seriously impact the transactions (e.g., sales) resulting from a presentation of item listings that satisfy a search query. Consequently, presenting the item listings that are most likely to result in a conclusion of a transaction in the most prominent positions on the search results page can increase a number of transactions. Unfortunately, it is difficult to identify the item listings that are most likely to result in sales.

One way to assess likelihood that an item listing will, if presented in a search results page, result in the conclusion of a transaction is to monitor certain user-initiated activities or events associated with the item listing or with item listings determined to be similar. For instance, if a particular item listing is presented in a list of item listings that satisfy a user's search query, and a user views the item listing, (e.g., by clicking on the item listing with a cursor control device, or otherwise selecting it), this event (referred to simply as a "view") may be used as a measure for demand for an item offered via the item listing. Accordingly, a total number of views an item listing receives can be used as a demand metric, which in turn, can be used to predict the likelihood that an item listing will result in a transaction if presented in the search results page. Similarly, a number of search impressions, bids (for auction item listings), watch lists, actual sales, and other events can be used as demand metrics as well. Using this general approach, with all else equal, given two item listings where a first item listing has been viewed ten times, and the other item listing viewed only once, the item listing viewed ten times would have a higher demand metric, and thus would be positioned first (e.g., at the top) of a search results page.

One problem with this approach is that timing of events used to derive the demand metric for the item listings is not taken into consideration. For example, referring to FIG. 1, three event timelines are shown. The event timeline with reference number 2-A shows the timing of the events 8-A (represented as vertical lines) used in deriving the demand metric for Item Listing A. Similarly, the event timelines with reference numbers 2-B and 2-C show the timing of events used in deriving the demand metrics for Item Listings B and C, respectively. For this example, the events could represent any combination of search impressions, views, bids, sales, watch lists, or other similar user-initiated actions. A graph 4 shows a value of the demand metrics for the three item listings over a period of time (e.g., 50 days). For purposes of this example, if it is assumed that time is measured in days, a line 6-A in the graph 4 representing the demand metric for item listing A rises relatively quickly from zero to ten with a steep slope over the first (approximately) ten days. Because the events 8-B for item listing B occurred more evenly spaced throughout days zero to fifty, a line 6-B representing the demand metric for item listing B rises from zero to ten with a more gradual slope over fifty days. Finally, for item listing C, because all ten events 8-C occur within the last (approximately) ten days, a line 6-C representing the demand metric for item listing C rises from zero to ten over the course of the final ten days.

Figure 1:
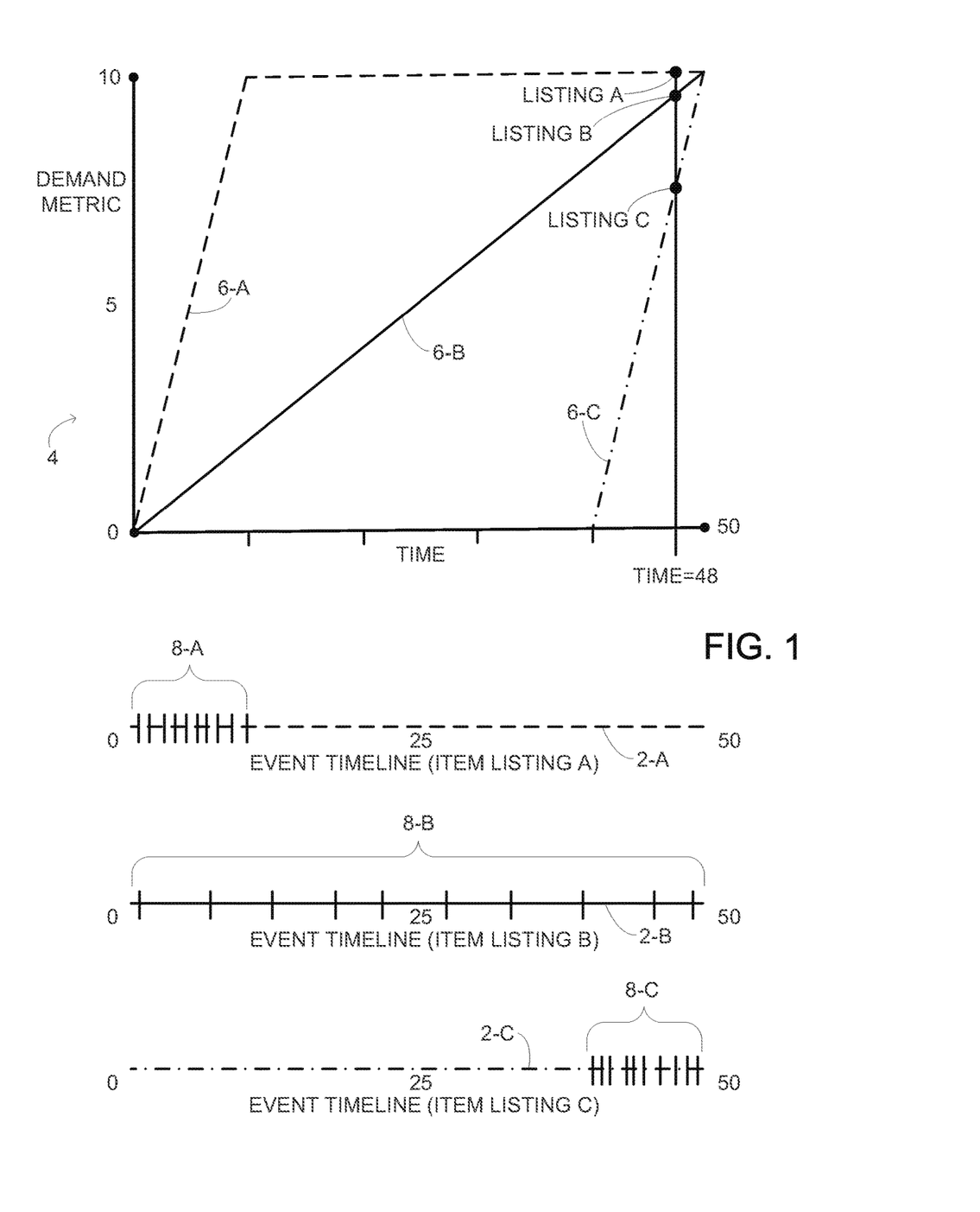
FIG. 1 is a chart illustrating values of three demand metrics over time, for each of three different item listings with varying event timelines.

The scenarios for which the example may be applicable are endless. However, in one scenario, Item Listing A may be for a first version of a product, whereas Item Listing C is a newly released, improved version of the same product. In such a scenario, the new and improved product associated with Item Listing C may naturally be expected to outsell the product it is replacing, associated with Item Listing A. As shown in the graph, at TIME=48 (representing day forty-eight), the demand metrics for Item Listings A, B and C are (approximately) ten, nine and seven, respectively. Despite the concentrated number of events 8-C associated with item listing C that occurred in the several days leading up to day forty-eight, and the fact that no event has occurred in the previous (approximately) thirty-eight days for Item Listing A, the demand metric for Item Listing A is greater than that of Item Listings B and C. Consequently, a better method and system for assessing demand metrics used in determining the likelihood that an item listing will result in a sale is desired. That method can be used for presenting aspects for item listings returned in a search results page as subsequently described.

DESCRIPTION OF THE DRAWINGS

Some embodiments are illustrated by way of example and not limitation in the figures of the accompanying drawings, in which.

DETAILED DESCRIPTION

Methods and systems for deriving demand metrics for use in assessing the likelihood that an item listing, if presented in a search results page, will result in a transaction are described. In the following description, for purposes of explanation, numerous specific details are set forth in order to provide a thorough understanding of the various aspects of different embodiments presented herein. It will be evident, however, to one skilled in the art, that the present embodiment may be practiced without these specific details.

In some embodiments, when a user submits a search query to an on-line trading application, the item listings that satisfy the search query are assigned a ranking score, and ordered based on the ranking score, when presented in a search results page. Depending on the particular implementation, many inputs (e.g., factors and/or component scores) may be used to derive an overall ranking score. In some embodiments, the ranking score assigned to each item listing that satisfies the search query may be based solely, or in part, on one or more observed demand metrics derived for each item listing based on an analysis of certain events that occur in connection with the item listings. For instance, a demand metric may be based on events including a number of search impressions an item listing has received, a number of views, a number of bids, a number of transactions, a number of times a user has added an item listing to a watch list, or some similar user-initiated interaction with an item listing. A search impression is simply a presentation of an item listing in a search results page. For instance, each time an item listing is presented in a search results page, a search impression count for the item listing is increased. A view results when a user selects an item listing presented in a search results page and a detailed view of the item listing is presented. In some embodiments, a user may be able to monitor activities associated with an item listing, for example, by adding an item listing to a watch list. Accordingly, the number of times an item listing has been added to a watch list might be used as a demand metric.

Consistent with the embodiment, the value given to an event in calculating a demand metric is determined based on when the event occurred relative to the day and/or time the search request is being processed and the ranking score is being assigned to the item listing. For instance, those events occurring most recent in time are given greater weight than those occurring in the recent past. In particular and as described in greater detail below, in some embodiments, a half life formula is used to "discount" or "decay" the weight of events occurring in the past, when those events are used to derive a demand metric.

Figure 2:
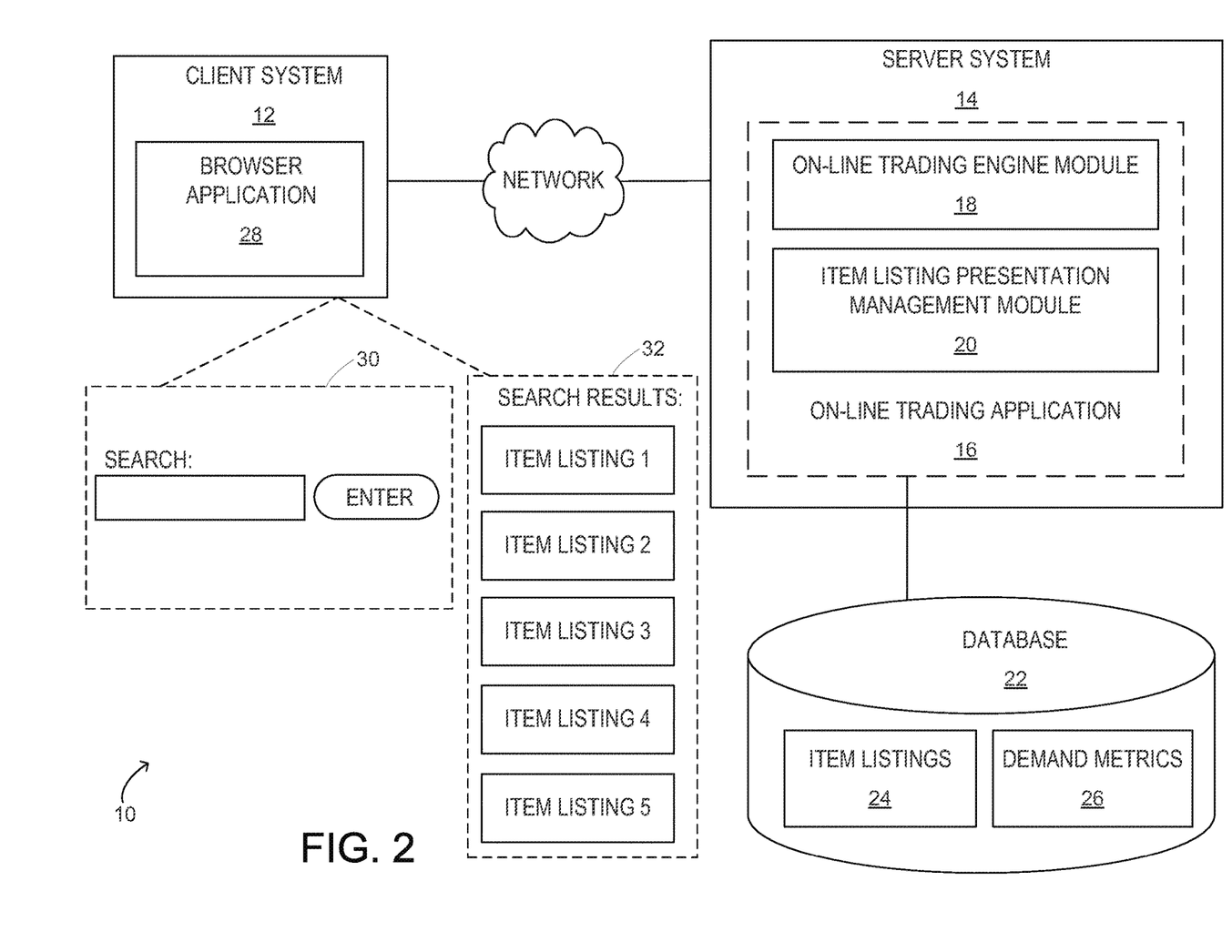
FIG. 2 is a block diagram of a network environment including a network-connected client system and server system, with which an embodiment herein may be implemented.

FIG. 2 is a block diagram of a network environment 10 including a network-connected client system 12 and server system 14, with which an embodiment herein may be implemented. As illustrated in FIG. 2, the server system 14 is shown to include an on-line trading application 16. In this example, the online trading application 16 is comprised of two primary modules—an on-line trading engine module 18 and an item listing presentation management module 20.

In some embodiments, the on-line trading engine module 18 may consist of a variety of sub-components or modules, which provide some of the functions of an on-line trading application 16. As described more completely below, each module may be comprised of software instructions, computer hardware components, or a combination of both. To avoid obscuring the written description in unnecessary detail, only a few of the on-line trading engine functions (germane to embodiments here) are described. For example, the on-line trading engine module 18 may include an item listing management module (not shown) that facilitates the receiving and storing of data representing item attributes, which collectively form an item listing. When a user desires to list a single item, or multiple items, for sale, the user will provide information about the item(s) (e.g., item attributes). Such information may be submitted via one or more forms of one or more web pages, via drop down lists, or similar user interface elements. The item listing management module receives the item attributes and stores the item attributes together within a database 22 as an item listing 24. In some instances, the item listings may be stored in an item listing database table. As described in greater detail below, the item attributes of each item listing are analyzed to determine a ranking score assigned to item listings and used in determining the position of item listings when the item listings are being presented in a search results page.

Referring again to FIG. 2, the second primary module of the on-line trading application 16 is the item listing presentation management module 20. The item listing presentation management module 20 provides the logic necessary to assign a ranking score (sometimes referred to as a Best Match Score) to item listings that satisfy a search query, and to use the ranking score to determine the order of item listings when the item listings are presented in a search results page. This may be done consistent with the algorithms, methods and systems described in greater detail in related U.S. patent application Ser. No. 12/476,143, filed on Jun. 1, 2009, entitled Methods and Systems for Deriving Demand Metrics used in Ordering Item Listings Presented in a Search Results Page and incorporated herein by reference in its entirety.

For instance, in some embodiments, a user operates a web browser application 28 on the client system 12 to interact with the on-line trading application residing and executing on the server system 14. As illustrated by the example user interface with reference number 30, a user may be presented with a search interface, with which the user can specify one or more search terms to be used in a search request submitted to the on-line trading application 16. In some embodiments, in addition to specifying search terms, users may be able to select certain item attributes, such as a desired color of an item, the item categories that are to be searched, and so on. After receiving and processing the search request, the on-line trading application 16 communicates a response to the web browser application 28 on the client system 12. For instance, the response is an Internet document or web page that, when rendered by the browser application 28, displays a search results page showing several item listings that satisfy the user's search request. As illustrated in the example search results page 32 of FIG. 2, the item listings are arranged or positioned on the search results page in an order determined by the item listing presentation management module 20. The item listings are, in some embodiments, presented by a presentation module (not shown), which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner based on their ranking scores. For instance, instead of using a simple list, in some embodiments the item listings may be presented one item listing per page or arranged in some manner other than a top-down list.

The ranking score used to order the item listings may be based on several component scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. For instance, in some embodiments, the ranking score may be based on a single component score, such as the listing quality score. One or more of the components scores may be based on, or equivalent to, a demand metric calculated as described below.

In some embodiments, a demand metric is essentially a score calculated as a count of the number of events (e.g., search impressions, views, bids, watch lists, and so on) that occur for a particular item listing, where events that occurred in the past are discounted as described below. In some embodiments, the score may be based on a combination of different events (e.g., bids and search impressions), or alternatively, the score may be based on a count of events of a single type, such as the number of search impressions. However, because events that have occurred more recently (i.e., closer in time to the search request) are a more meaningful predictor of demand, events that occurred in the past are given less weight in deriving the demand metric. In some embodiments, the score for a demand metric is calculated using a half life formula, such as:

$$SCORE(t,n) = 2^T((-\{t\}_{n}\Gamma t_j(n-1))/\lambda) * SCORE(t_1(n-1)) + \text{Incremental Score}$$

Accordingly, for those events counting toward the score, but occurring in a prior time period, the value of such events is reduced exponentially over time, consistent with the equation above.

In this equation, the Incremental Score represents the events that have occurred in the current time period for which the demand metric is being calculated. For example, if the demand metric is calculated every ten days (a time period), the Incremental Score may simply be a count of the relevant events that occurred in the past ten days. For all events occurring in a prior time period, the value of those events that count toward the score decays exponentially over time. The exponential expression $\{t\}_n - t_{n-1}$ represents the time since the last update of the "decayed" count occurred. In some embodiments, the granularity of this time delta is close to the fastest expected frequency with which demand metrics will be updated. The parameter lambda in the equation above represents the time in days until the contribution of an event (e.g., a search impression, bid, view, etc.) to the score is reduced by half. In some embodiments, the value of lambda will be configurable, for example, by item categories or sites.

Figure 3:
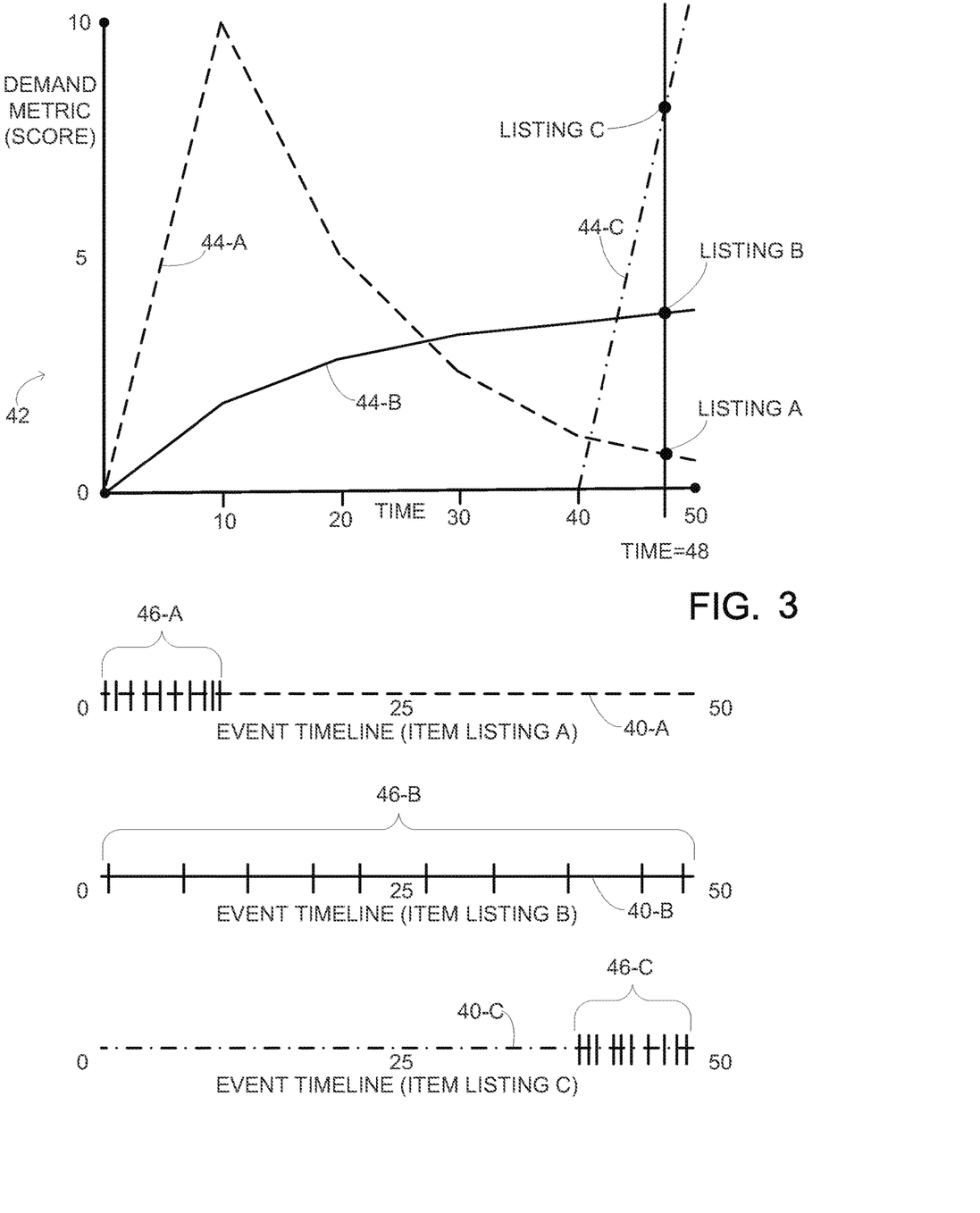
FIG. 3 is a chart illustrating values of three demand metrics over time, for each of three different item listings with varying event timelines, where the demand metrics have been calculated with methods consistent with an embodiment herein.

FIG. 3 illustrates a graph 42 showing an example of the value of demand metrics over time for three different item listings, according to an embodiment. In FIG. 3, three event timelines 40-A, 40-B and 40-C are shown for three different item listings. These event timelines are the same as those illustrated in FIG. 1. The event timeline with reference number 40-A shows the timing of events 46-A (represented as vertical lines) used in deriving the demand metric for Item Listing A. Similarly, the event timelines with reference numbers 40-B and 40-C show the timing of events used in deriving the demand metrics for Item Listings B and C, respectively. Again, the events represent the occurrence of certain user-initiated activities, such as search impressions, views, bids, sales, watch lists, or other similar user-initiated actions. The graph 42 shows the value of the demand metrics for the three item listings over a period of time (e.g., 50 days). For purposes of this example, the demand metrics are calculated every ten days.

As shown in FIG. 3, a line 44-A representing the demand metric score for item listing A rises with a rapid slope from zero to ten over the first ten days. Accordingly, at day ten, the value of the demand metric for item listing A is ten. However, over the next ten days (days ten to twenty), no events are recorded for item listing A. Accordingly, the demand metric score for item listing A at day twenty decreases to five. In this example, the value of lambda is ten, such that the value of the demand metric from one time period (ten days) to the next results in a reduction by half. At day thirty, the demand metric scores are re-computed. Because item listing A has no recorded events for days twenty to thirty, the demand metric score is again reduced by half, to two and one-half. As shown in FIG. 3, the demand metric score for item listing A is again reduced by half such that on day forty-eight the demand metric score for item listing A is just over one.

The demand metric score for item listing B, represented by a line with reference number 44-B, rises from zero to two over the first ten day period. Over days ten to twenty, two additional events occur for item listing B. Accordingly, at day twenty, the demand metric score is equal to three—two for the events occurring in days ten to twenty, and one (half of two) for the two events occurring in days zero to ten. At day fifty, the value of the demand metric score for item listing B is just under four (3.875).

For item listing C, the demand metric score is zero until the final time period. During the final ten days shown in the graph 42, item listing C records ten events. Accordingly, at day fifty, the demand metric score for item listing C is ten.

If a demand metric score was calculated at day 48, the demand metric scores for the three item listings would be: item listing A (0.875), item listing B (3.875), and item listing C (approximately 9). This differs significantly from the result shown in FIG. 1, in which, at day forty-eight, item listing A has the highest demand metric score, followed by item listings B and C, respectively.

Figure 4:
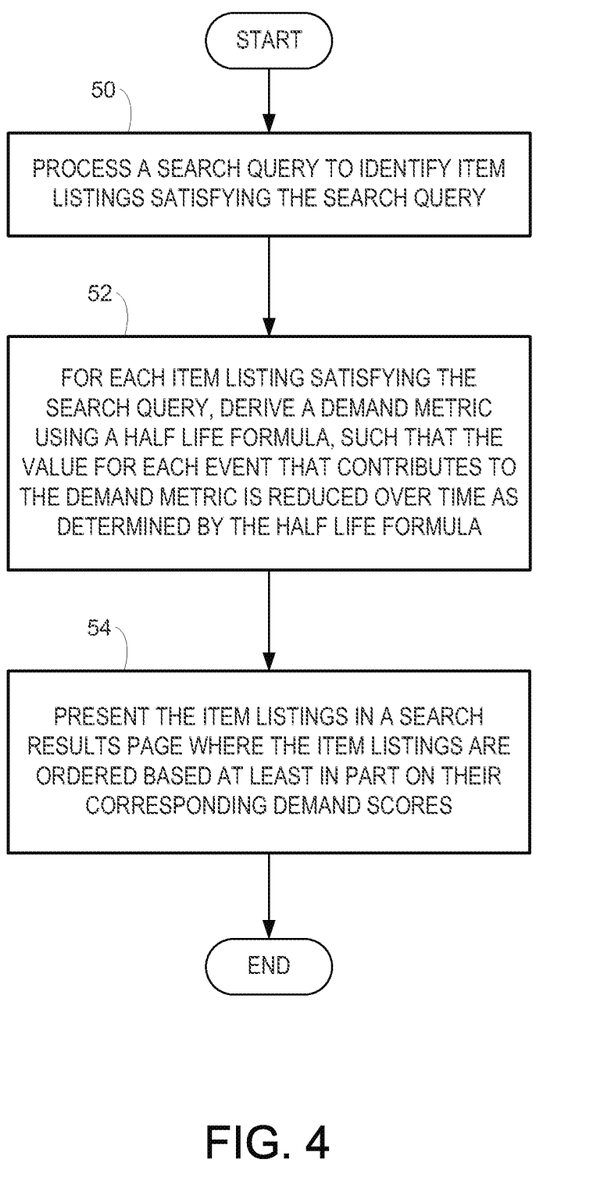
FIG. 4 is a flow diagram illustrating method operations for deriving a demand metric for use in ordering item listings, according to an embodiment herein.

FIG. 4 illustrates a method, according to an embodiment, for deriving a demand metric with a half life formula for use in ordering item listings presented in a search results page. At method operation 50, a search query is processed to identify item listings satisfying the search query. For instance, a user may submit a search query (with search terms) via a web-based form, or other web page. When the search query is received, a search engine, processes the search query to identify item listings that satisfy the search query.

Next, at method operation 52, for each item listing determined to satisfy the search query, a demand metric is derived for use in ranking or ordering the item listings. The demand metric may be pre-computed, such that, at the time of processing the search query, the demand metric is simply looked-up. For instance, in some embodiments, the demand metrics for each item listing are periodically calculated. The demand metric may be based solely on a count of one type of event, such as search impressions, or any combination of events, to include, search impressions, views, bids, sales, and watch list entries. When deriving the demand metric, the value of those events occurring during a prior time period are discounted (or decayed) as determined by a half-life formula (or another similar formula), giving greater weight to the more recently occurring events.

Finally, at method operation 54, the item listings are presented in a search results page ordered at least in part based on their corresponding demand metrics. For instance, in some embodiments, the demand metrics may be an input for calculating a ranking score. In other embodiments, the demand metric may be the actual ranking score.

A method of using a demand metric in attempting to disambiguate an ambiguously identified product category by presenting aspects of a demand metric is discussed below. The drawing may illustrate these aspects as images or words representing the aspects. As used in this method, the demand metric is also called the "dominant product category." This disambiguation may allow a user to shop by aspect of a desired product. An example can be seen in the description of a watch finder of FIGS. 5B and 5C.

Figure 5A:
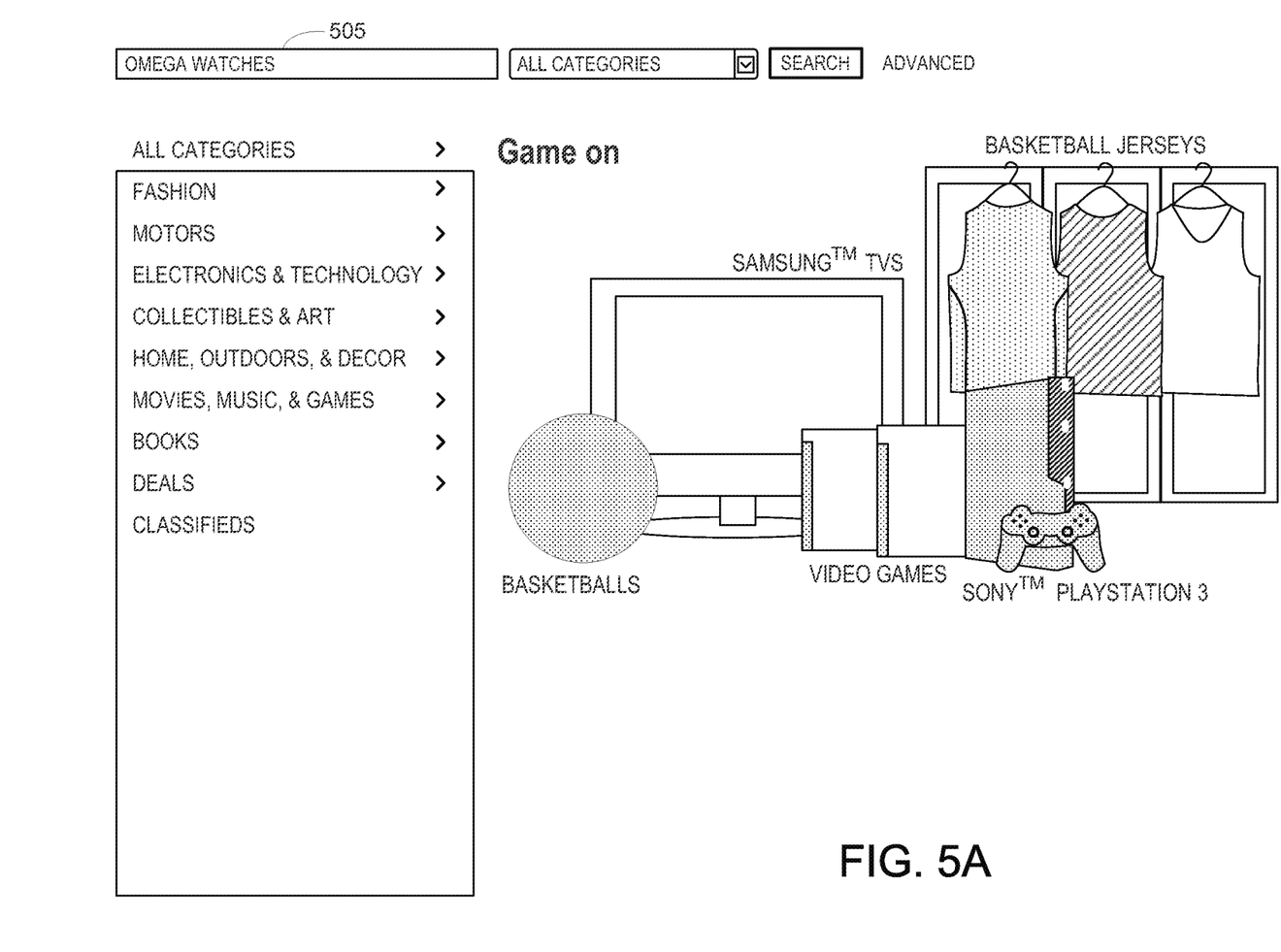
FIG. 5A is an illustration of a search page useful in accordance with an embodiment herein.

For example, when a shopper is on any given web page that has a search box, such as the page seen in FIG. 5A, the shopper may enter a product brand as a keyword in a search box 505 of FIG. 5A. In this case the brand is "Omega Watches" 510. The brand may ambiguously define a product category in the sense that "Omega Watches" may apply to a number of watch categories—wristwatch, pocket watch, pendant watch, and the like, that the brand bids. Therefore an attempt may be made to disambiguate the keyword, here "Omega Watches." For example, the system may determine what demand metric (which may also be called a "dominant product category"), computed as described above, the keyword falls into. For example, as stated above, the keyword entered into the search box 505 is "Omega Watches." Using the method described above, the dominant product category (e.g., the most likely product category the user desires or intends when entering "Omega Watches") may be determined to be "Wristwatches" (which, as discussed below, has a parent category of "Watches."

Given, in this example, that the dominant product category may be computed as "Wristwatches," the user may now be presented with a product category finder. In the case of this example, the product category finder may be the watch finder 520 of FIG. 5B integrated within a search results page with "Omega" pre-selected in a Brand box 521. Preselection is not essential but is useful in our examples.

Figure 5B:
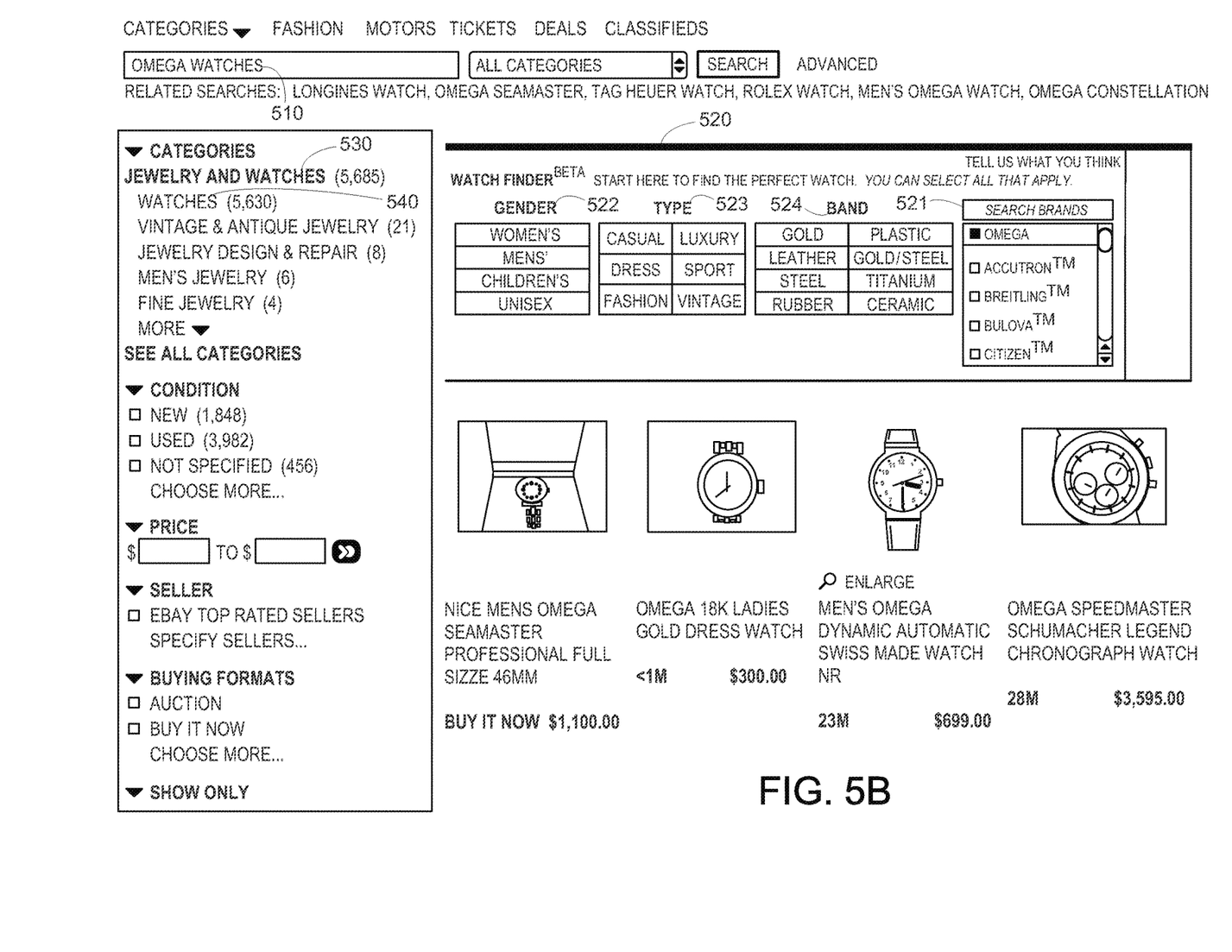
FIG. 5B is an illustration of one aspect of an embodiment.
Figure 5C:
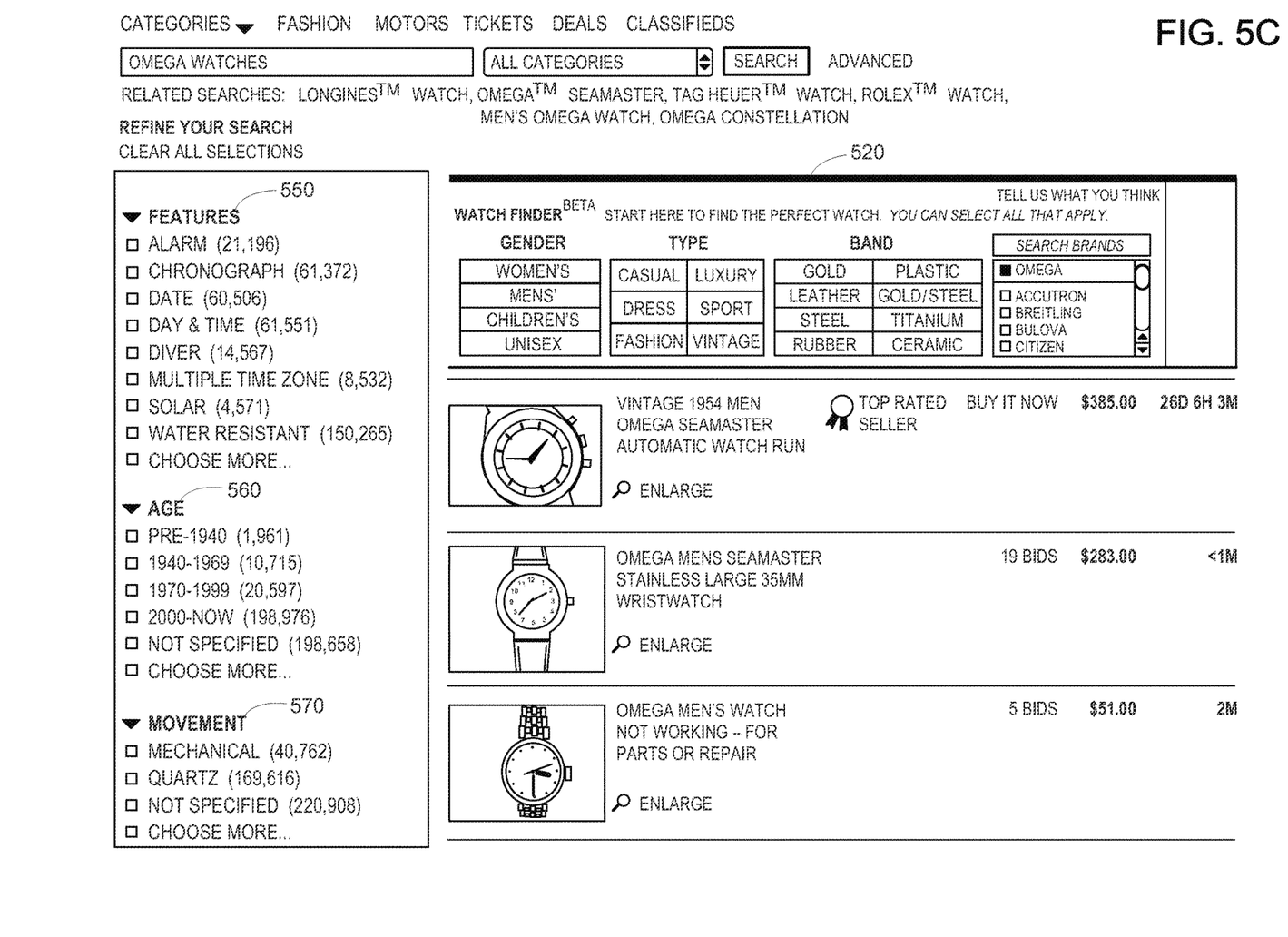
FIG. 5C is an illustration of a continuation of operation of the aspect of FIG. 5B.

The watch finder 520 may be for any type of watch (e.g., wristwatch, pocket watch, pendant watch, and the like). However, in the current example with the dominant category computed as "wristwatches," the watch finder 520 presents a number, for example, four, of selectable aspects that may be important to the wristwatch buying experience—Gender 522, Type 523, Band 524, and Brand 521, with, in this example, Brand 521 having been preselected as "Omega Watches" as noted previously.

Other appropriate aspects may be used. At this point, although the dominant product category has been computed, the product category the user desires or intends is still not unambiguously identified as "wristwatches,"—that is, the system has not "defaulted to" or decided that the intended product category is the "Wristwatches" category. Rather, by presenting wristwatch aspects to the user as a result of computing the dominant category as being "wristwatches," the system is attempting to disambiguate the user's query by prompting him or her with relevant wristwatch aspects in the watch finder 520 as in FIG. 5B. If the user interacts with any of these relevant wristwatch aspects, such as Gender 522, Type 523, or Band 524, the user's intent to purchase a wristwatch is very clear or "disambiguated." The user's query will now be "defaulted" or switched to the Wristwatch category and the user will be presented with additional wristwatch aspects such as "Features" 550, "Movement 560", and "Age" 570 as at FIG. 5C. Again, other appropriate aspects may also be used.

Referring back to FIG. 5B, hierarchically related selectable product category aspects are presented to a user. For example, "Jewelry & Watches," "Watches," and under "Watches," the aspect "Wristwatches" may be presented. If the user clicks on "Jewelry & Watches" 530, "Watches" 540, and then "Wristwatches" in the left hand navigation of FIG. 5B ("Wristwatches" is not shown in FIG. 5B but may be one of the selectable choices under "Watches"), he or she has selected a plurality of members of the hierarchy that unambiguously identify wristwatches as the product category. In this example, the user may therefore be presented with the watch finder 502 discussed above, as well as other relevant wristwatch aspects on the left navigation (the left navigation being only one example of placement of these aspects). That is, the user in this example will also see aspects that apply to wristwatches, such as "Features" 550, "Age" 560, "Movement" 570 as seen in the left navigation of FIG. 5C.

However, if the user selects only "Jewelry & Watches" 530 or "Watches" 540 in the left navigation pane of FIG. 5B, without continuing on to select "Wristwatches," the intended product category is, again, ambiguously identified. In an attempt to disambiguate the intended product category, the user may then be presented with the watch finder 520 but not the other aspects specific to "Wristwatches,"—in our example Features 550, Age 560, Movement 570 (e.g., the left navigation pane will not (?) look the same as or similar to the left navigation pane in FIG. 5B) because user intent may not be unambiguous at this point). However, since both these categories "Jewelry & Watches" and "Watches" are "parent" categories to "Wristwatches", the system still attempts to disambiguate the user's search term based on the commonality of elements selected in the hierarchically related selectable product category aspects by providing the watch finder 520 of FIG. 5B. If the user now selects one or more aspects in the watch finder 520 that is specific to wristwatches, such as "band," the product category has been unambiguously identified as wristwatches (i.e., the query has been disambiguated) and the wristwatch aspects such as Features 550, Age 560, and Movement 570 may be presented as discussed above.

While the watch finder 520 is used for this example, those of ordinary skill in the art will appreciate that any type of product category finder can be used. That is, the finder can be a finder for any type of product category, disambiguating a brand for that product category by returning aspects for the dominant product category as discussed above.

Figure 6:
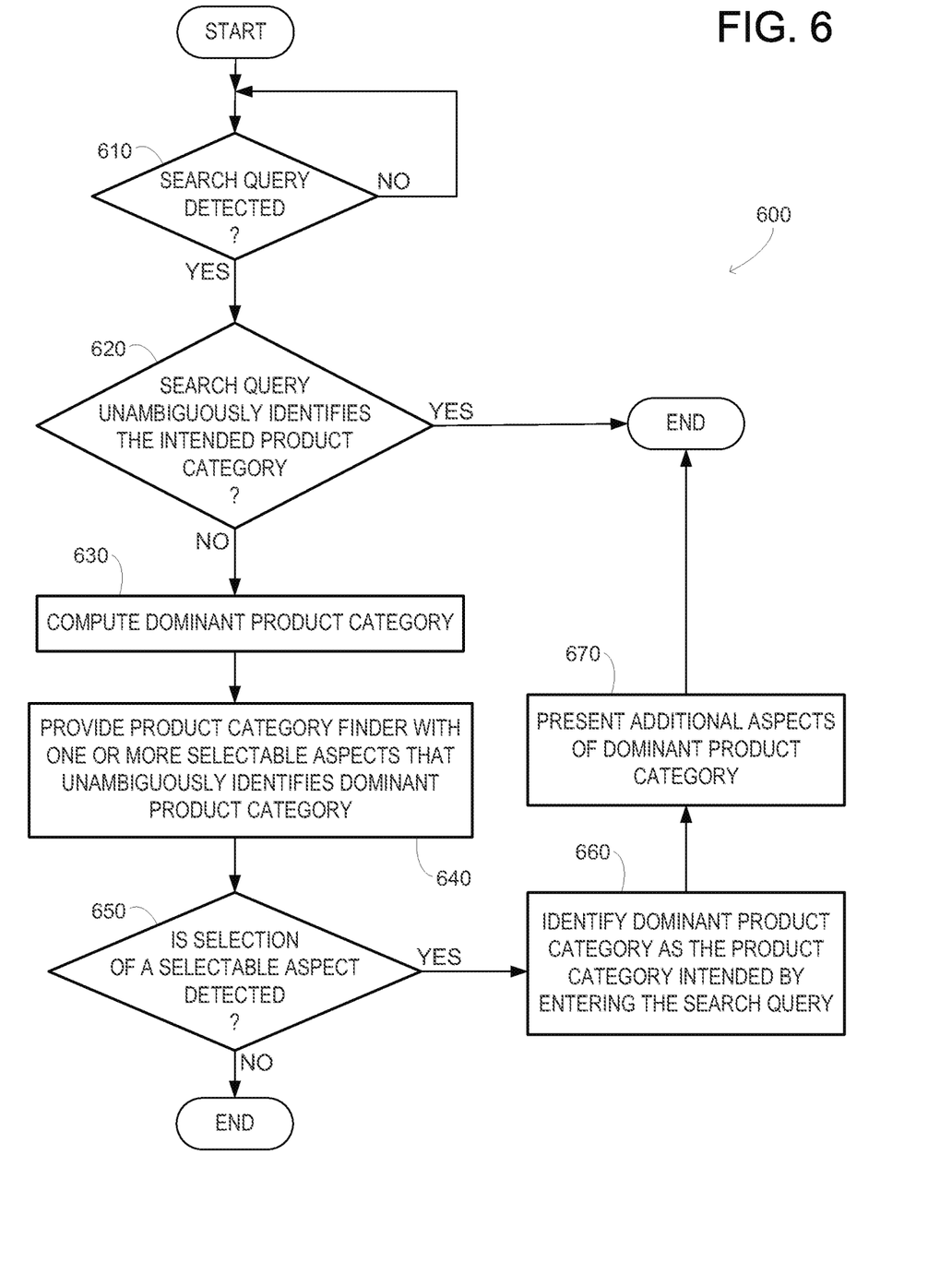
FIG. 6 is a flowchart illustrating an embodiment herein.

A flowchart illustrating the operation of one of the above methods is shown in FIG. 6. At step 610, the system may check to detect whether a search query has been received from a user such via the search box 505 of FIG. 5A. If a search query is received, the method proceeds to step 620 where it may be determined whether the search query unambiguously identifies a product category. If the product category is not unambiguously identified at step 620, that is, if the product category is ambiguously identified as explained above in connection with the entering of "Omega Watches," the system computes the dominant product category as at step 630. At step 640, the system provides a product category finder similar in function to the watch finder 520 of FIG. 5B for rendering to the user selectable aspects. The selection of one or more of the aspects disambiguates the product category. This is similar to aspects 521, 522, 523, 524, of FIG. 5B. If it is detected at step 650 that a selectable aspect is selected, this disambiguates the query to, for example, "Wristwatches." Therefore, at step 660 the dominant product category is identified as the product category the user intended when entering the search query. The product category finder may then present additional aspects for the identified product category as with the watch finder as at 550, 560, 570 in FIG. 5C in step 670.

Figure 7:
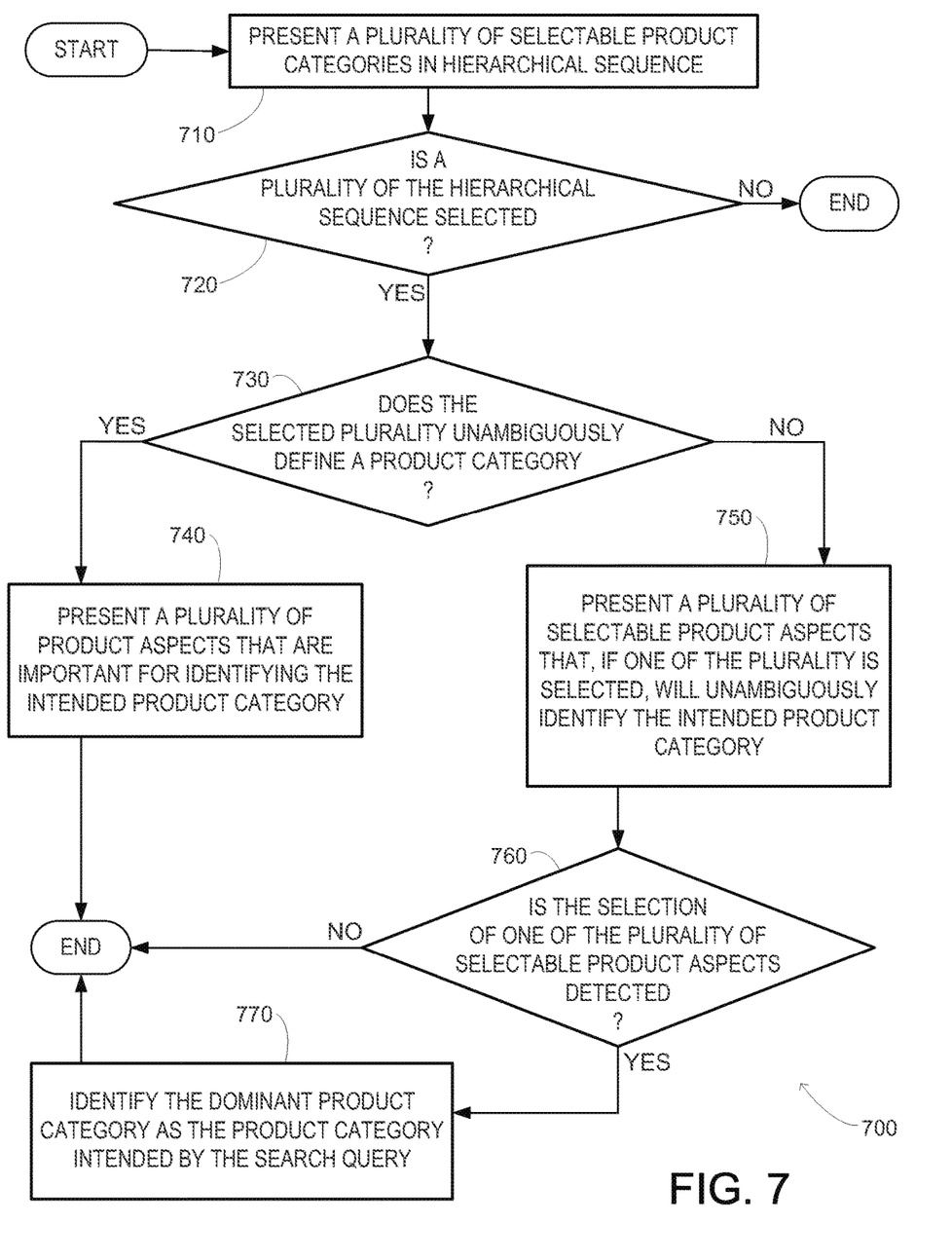
FIG. 7 is a flowchart illustrating another embodiment herein.

FIG. 7 illustrates an additional method described above. At step 710, a plurality of selectable product categories are presented in hierarchical sequence. For example the sequence may comprise Jewelry & Watches 530, Watches 640, and Wristwatches as alluded to in FIG. 5B. Step 720 detects whether a plurality of the hierarchical sequence is selected. If yes, step 730 detects whether the selected plurality unambiguously defines a product category. If yes, then at step 740 a plurality of product aspects that are important for identifying the intended product category are presented for rendering to the user. If at step 730 it is determined that the selected plurality does not ambiguously define a product category, disambiguation is attempted at step 750 by presenting a plurality of selectable product aspects that, if one or more is selected, unambiguously identifies the intended product category, as illustrated in the example watch finder of FIG. 5C. This may be accomplished using a product category finder similar to the watch finder of FIG. 5B. If one of the plurality is detected as being selected at step 760, the dominant selected query then unambiguously identifies the product category intended by the search query, as indicated at step 770. Additional aspects specific to the identified product category may then be presented to the user as step 780 (e.g., similar to the aspects 550, 560, 570 in FIG. 5C).

The various operations of example methods described herein may be performed, at least partially, by one or more processors that are temporarily configured (e.g., by software) or permanently configured to perform the relevant operations. Whether temporarily or permanently configured, such processors may constitute hardware-implemented, or processor-implemented modules that operate to perform one or more operations or functions. The modules referred to herein may, in some example embodiments, comprise hardware-implemented or processor-implemented modules.

Similarly, the methods described herein may be at least partially hardware-implemented or processor-implemented. For example, at least some of the operations of a method may be performed by one or more hardware components, processors, or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example Computer System

Figure 8:
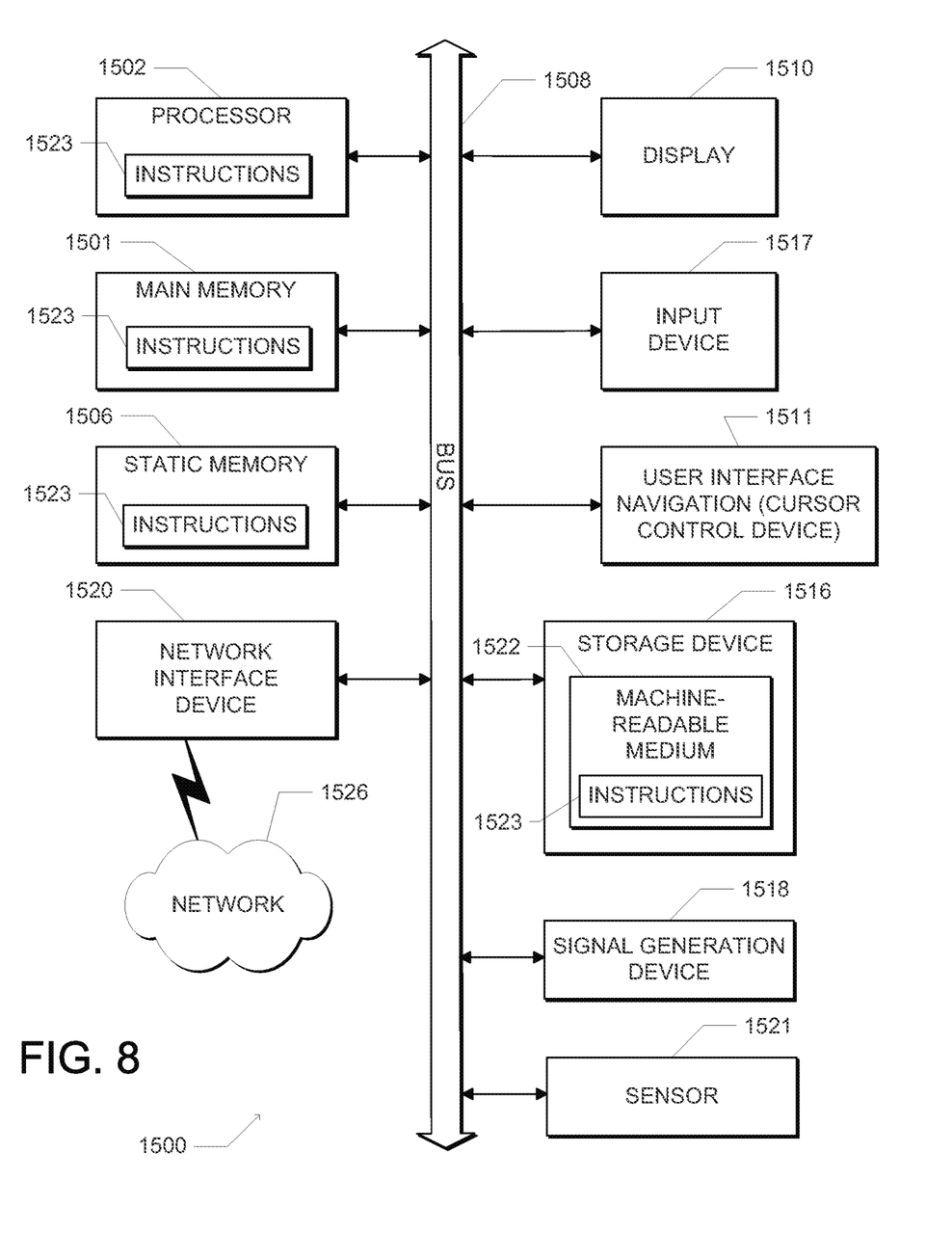
FIG. 8 is a block diagram of a machine in the form of a computer within which a set of instructions, for causing the machine to perform any one or more of the methodologies discussed herein, may be executed.

FIG. 8 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software instructions 1523) embodying or utilized by any one or more of the methodologies or functions described herein. The software instructions 1523 may also reside, completely or at least partially, within the main memory 1501 and/or within the processor 1502 and/or static memory 1506 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium"

shall also be taken to include any tangible medium that is capable of storing, encoding or carrying instructions for execution by the machine and that cause the machine to perform any one or more of the methodologies of the embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method in a networked electronic publication system, the method comprising:
    detecting, over a network from a client machine, entry of a search query that includes a keyword, the keyword corresponding to a plurality of product categories and being ambiguous as to which of the plurality of product categories is an intended product category of the search query;
    analyzing online activity with respect to item listings of a particular product category of the plurality of product categories, the online activity including one or more events selected from a group of events consisting of: a number of online search impressions of each of one or more of the item listings; a number of online views of each of one or more of the item listings; a number of online bids for each of one or more of the item listings; and a number of times a user has added each of one or more of the item listings to a watch list;
    determining a demand metric, for the particular product category based on the one or more events of the analyzed online activity, the determining of the demand metric including determining a numerical score based on the one or more events in which a weighting of the events that contribute to determining the numerical score is such that events that occurred more recently are weighted higher than events that occurred less recently, the demand metric predicting a particular likelihood of a transaction occurring with respect to one or more items that correspond to one or more of the item listings of the particular product category in response to presentation of the corresponding one or more item listings of the particular product category;
    determining that the particular product category is the intended product category of the search query based on the keyword corresponding to the particular product category and based on the demand metric;
    responsive to the particular product category being determined as being the intended product category of the search query, providing selectable images of aspects of the particular product category including providing the particular product category in a hierarchy of product categories, for rendering at the client machine;
    detecting the selection at the client machine of at least one of the selectable images of aspects of the particular product category;
    responsive to detecting the selection at the client machine of at least one of the selectable images of aspects of the particular product category, disambiguating which of the plurality of product categories is the intended product category by confirming that the particular product category is the intended product category of the search query; and
    providing, as a response to the search query and in response to the particular product category being determined to be the intended product category of the search query, selectable images of additional aspects of the particular product category, for rendering at the client machine.

2. The method of claim 1, wherein the keyword comprises a brand name that applies to a number of product categories within a hierarchy of product categories.

3. The method of claim 1, wherein the selectable images of aspects of the particular product category are unique to the particular product category as compared to the other product categories of the plurality of product categories.

4. One or more computer-readable hardware storage devices having embedded therein a set of instructions that, in response to being executed by one or more processors of a system, causes the system to execute operations comprising:
    detecting, over a network from a client machine, entry of a search query that includes a keyword, the keyword corresponding to a plurality of product categories and being ambiguous as to which of the plurality of product categories is an intended product category of the search query;
    analyzing online activity with respect to item listings of a particular product category of the plurality of product categories;
    determining a demand metric for the particular product category based on the analyzed online activity, the determining of the demand metric including determining a numerical score based on one or more events of the online activity in which a weighting of the events that contribute to determining the numerical score is such that events that occurred more recently are weighted higher than events that occurred less recently, the demand metric predicting a particular likelihood of a transaction occurring with respect to one or more items that correspond to one or more of the item listings of the particular product category in response to presentation of the corresponding one or more item listings of the particular product category;

determining that the particular product category is the intended product category of the search query based on the keyword corresponding to the particular product category and based on the demand metric;

responsive to the particular product category being determined as being the intended product category of the search query, providing selectable images of aspects of the particular product category including providing the particular product category in a hierarchy of product categories, for rendering at the client machine;

detecting the selection at the client machine of at least one of the selectable images of aspects of the particular product category;

responsive to detecting the selection at the client machine of at least one of the selectable images of aspects of the particular product category, disambiguating which of the plurality of product categories is the intended product category by confirming that the particular product category is the intended product category of the search query; and providing, as a response to the search query and in response to the particular product category being determined to be the intended product category of the search query, selectable images of additional aspects of the particular product category, for rendering at the client machine.

5. The one or more computer-readable hardware storage devices of claim 4, wherein the keyword comprises a brand name that applies to a number of product categories within a hierarchy of product categories.

6. The one or more computer-readable hardware storage devices of claim 4, wherein the one or more events are selected from a group of events consisting of: a number of online search impressions of each of one or more of the item listings; a number of online views of each of one or more of the item listings; a number of online bids for each of one or more of the item listings; and a number of times a user has added each of one or more of the item listings to a watch list.

7. The one or more computer-readable hardware storage devices of claim 4, wherein the selectable images of aspects of the particular product category are unique to the particular product category as compared to the other product categories of the plurality of product categories.

8. A system comprising:
one or more processors; and
one or more computer-readable hardware storage devices having embedded therein a set of instructions which, in response to being executed by the one or more processors of, causes the system to execute operations comprising;

detecting, over a network from a client machine, entry of a search query that includes a keyword, the keyword corresponding to a plurality of product categories and being ambiguous as to which of the plurality of product categories is an intended product category of the search query;

analyzing online activity with respect to item listings of a particular product category of the plurality of product categories;

determining a demand metric for the particular product category based on the analyzed online activity, the determining of the demand metric including determining a numerical score based on one or more events of the online activity in which a weighting of the events that contribute to determining the numerical score is such that events that occurred more recently are weighted higher than events that occurred less recently, the demand metric predicting a particular likelihood of a transaction occurring with respect to one or more items that correspond to one or more of the item listings of the particular product category in response to presentation of the corresponding one or more item listings of the particular product category;

determining that the particular product category is the intended product category of the search query based on the keyword corresponding to the particular product category and based on the demand metric;

responsive to the particular product category being determined as being the intended product category of the search query, providing selectable images of aspects of the particular product category including providing the particular product category in a hierarchy of product categories, for rendering at the client machine;

detecting the selection at the client machine of at least one of the selectable images of aspects of the particular product category;

responsive to detection of the selection at the client machine of at least one of the selectable images of aspects of the particular product category, disambiguating which of the plurality of product categories is the intended product category by confirming that the particular product category is the intended product category of the search query; and providing, as a response to the search query and in response to the particular product category being determined to be the intended product category of the search query, selectable images of additional aspects of the particular product category, for rendering at the client machine.

9. The system of claim 8 wherein, the keyword comprises a brand name that applies to a number of product categories within a hierarchy of product categories.

10. The system of claim 8, wherein the selectable images of aspects of the particular product category are unique to the particular product category as compared to the other product categories of the plurality of product categories.

11. The system of claim 8, wherein the one or more events are selected from a group of events consisting of: a number of online search impressions of each of one or more of the item listings; a number of online views of each of one or more of the item listings; a number of online bids for each of one or more of the item listings; and a number of times a user has added each of one or more of the item listings to a watch list.

* * * * *